(12) United States Patent
Fichtner et al.

(10) Patent No.: US 6,202,984 B1
(45) Date of Patent: Mar. 20, 2001

(54) SHUT-OFF DEVICE FOR PIPES

(75) Inventors: Lothar Fichtner, Volkmarsen; Markus Rosam, Niederndodeleben, both of (DE)

(73) Assignee: Prazisionsarmaturen Ostfalenpark Barieben GmbH, Barieben (DE)

( * ) Notice: Subject to any disclaimer, the term of this patent is extended or adjusted under 35 U.S.C. 154(b) by 0 days.

(21) Appl. No.: 09/384,843

(22) Filed: Aug. 27, 1999

(30) Foreign Application Priority Data

Sep. 3, 1998 (DE) .......................................... 198 40 1690

(51) Int. Cl.$^7$ .................................................. F16K 41/10
(52) U.S. Cl. ............................................................ 251/335.3
(58) Field of Search ................................ 251/335.3, 326

(56) References Cited

U.S. PATENT DOCUMENTS

| 3,573,863 | * | 4/1971 | Doors et al. | ........................ 251/335.3 |
| 3,826,465 | * | 7/1974 | Whittaker et al. | ............ 251/335.3 X |
| 5,634,627 | * | 6/1997 | Daido et al. | ........................ 251/335.3 |
| 5,662,335 | * | 7/1974 | Larsen | ............................ 251/335.3 X |

FOREIGN PATENT DOCUMENTS

| GM 18 97 709 | 7/1964 | (DE) . |
| 37 30 896 | 3/1989 | (DE) . |
| 89 11 579 | 2/1990 | (DE) . |
| 40 24 560 | 2/1992 | (DE) . |
| 0 271 113 | 6/1988 | (EP) . |
| 63-259285A | * 10/1988 | (JP) .............................. 251/335.3 R |

* cited by examiner

Primary Examiner—Kevin Shaver
Assistant Examiner—Eric Keasel
(74) Attorney, Agent, or Firm—James P. Hanrath

(57) ABSTRACT

The device is used for a shut-off device for pipes comprising a spindle communicating with a shut-off device arranged in a housing, whereas the spindle is borne in an upper part of the housing so as to be axially slidable, the upper part of the housing being provided with a cover resting on the housing, whereas the interior space of the cover is communicating with the medium led through the housing, whereas the spindle (40) is provided at its lower end facing the shut-off device (80) with a ring (60) carrying at least two concentrically arranged expansion bellows, whereas the inner expansion bellows (70) is communicating with the spindle (40) and the other outer expansion bellows (50) is communicating with the flange (11*b*) of the cover of the housing (11).

15 Claims, 2 Drawing Sheets

SHUT-OFF DEVICE FOR PIPES

BACKGROUND OF THE INVENTION

1. Field of the Invention

The present invention concerns a shut-off device for pipes comprising a spindle communicating with a shut-off device arranged in a housing, whereas the spindle is borne in an upper part of the housing so as to be axially slidable, the upper part of the housing being provided with a cover resting on the housing, whereas the interior space of the cover is communicating with the medium led through the housing.

2. Description of the Prior Art

A shut-off device of the type mentioned above has been manufactured for quite a few years. Shut-off devices for pipes, and more particularly stop slide valves, yet proved to often require big strokes as opposed to globe valves which get on well with relatively small strokes. In shut-off devices of the type mentioned above, it is indeed always necessary to completely remove the actual shut-off device, that is the key, from the open cross section of the pipe. Considerable efforts were therefore necessary to seal up the shut-off device for pipes against its environment, particularly when dealing with big nominal diameters.

SUMMARY OF THE INVENTION

The object of the present invention is therefore to provide a shut-off device for pipes of the type mentioned above by means of which tubes of big nominal diameters, that may be locked by slide valves, may be sealed up against their environment in a durable and reliable way so that the medium led inside the pipe conduit is securely prevented from leaking out. This is of particular interest when the medium led in the pipes is aggressive or toxic.

The solution of the invention is to provide the spindle at its lower end facing the shut-off device with a ring carrying at least two compactly arranged, preferably metallic expansion bellows that are placed in concentric arrangement, whereas the inner expansion bellows is communicating with the spindle and the other outer expansion bellows is communicating with the upper end, that is with the flange of the cover. The flange is provided with a boring through which the spindle may pass. Additionally to the flange, the cover also has a sleeve-type cover element attached to the flange. The two expansion bellows, that are concentric to each other and to the spindle, are for example soldered by their lower end to the ring. The inner expansion bellows continues to be compactly connected to the spindle by being for example soldered to it. The outer expansion bellows is connected by its upper end with the flange of the cover by being soldered or otherwise connected in a compact way. A hollow space is thus provided between the exterior side of the inner expansion bellows' wall and the inner side of the outer expansion bellows' wall, whereas said hollow space is not communicating with the medium contained in the housing. Said hollow space is however communicating with the boring of the spindle through the flange of the cover. It is thus guaranteed that, in case of intact expansion bellows, no medium can escape through the boring between cover and spindle. Thanks to the arrangement of two concentrically borne expansion bellows in a pipe-like cover, the overall height of the spindle itself as well as of the expansion bellows to be sealed up can be kept small.

As already mentioned at the beginning, the sealing of shut-off devices for pipes by means of slide valves in housings having a big diameter is very complicated. Long expansion bellows could not be used for sealing, since the longer the bellows the easier they tend to buckle or, at the slightest inner pressure, to bulge. As already explained and thanks to the arrangement of two concentrically borne expansion bellows, the length of each single bellows is reduced so that they are no more bulging under inner pressure nor buckling due to excessive length. As also already mentioned above, the overall height of the spindle itself can thus be reduced, which is advantageous from the manufacturing point of view.

As already explained, the inner bellows is connected to the spindle. The inner bellows is hereby preferably provided at its upper end with a transition ring for its connection with the spindle. This is necessary, since the bellows, which is for example made of metal, has a relatively small material cross section, whereas the spindle has a big mass. In order to prevent the expansion bellows from glowing out while connecting the bellows with the spindle in a compact way, for example by soldering, the transition ring is provided, the size of its cross section lying between the cross section of the spindle and that of the expansion bellows.

According to another characteristic of the invention, the ring is arranged or guided in an axially slidable way on the spindle on one side and in the cover, that is in the sleeve-type cover element, on the other. The spindle is hereby advantageously provided with a bearing surface for the ring, said bearing surface being for example designed as a circumferential shoulder. Thanks to the axially slidable arrangement of the ring on the spindle as well as in the sleeve-type cover element, the inner expansion bellows is first expanded when for example the key is taken out of the pipe, the spindle then creeping axially upwards. When a determined expansion of the inner bellows is achieved, the ring also creeps upwards according to the spindle's movement. In a more detailed description, this process is the following: the spindle is provided with a holder for the shut-off device. This holder is hitting the ring at a determined vertical displacement of the spindle and is thus taking it along. Accordingly, the distance to be covered between the two bellows during the axial deformation of the expansion bellows is apportioned so that each bellows only has to cover a determined, relatively short distance. The use of relatively short bellows is thus made possible with all the advantages already explained.

According to another characteristic of the invention, the inner expansion bellows is impinged by the inner pressure of the medium, whereas the outer expansion bellows is impinged by the outside pressure of the medium. That means that the shorter expansion bellows is impinged from the inside, which is not relevant, since it does not tend to bulge thanks to its short length. The strain exerted by the medium's pressure onto the outer circumference of the outside expansion bellows is not relevant either since the expansion bellows can withstand relatively high external pressures. Therefore, the ring is provided with a passage leading to the inner space of the inner expansion bellows and with a passage leading to the space between the inner wall of the sleeve-type body of the cover and the outer wall of the outer expansion bellows, both passages guaranteeing that infiltrated medium may flow out again. These passages are therefore also called relief borings.

If, for all that, an expansion bellows happens to be damaged, a gland encompassing the spindle is provided in the housing cover, said gland serving as additional securing means intended to keep the medium away from its environment. The gland itself is arranged in a gland casing arranged in the cover. An advantage thereof is that the outer expansion bellows is fastened onto the gland casing in the way described above.

According to another advantageous characteristic, the spindle is secured against torsion. Such a safety device against torsion prevents the expansion bellows from torsioning, which would directly destroy them. The upper part of the housing has a housing bridge for the guidance of the spindle, whereas the housing bridge is connected with the cover by several pillars, said pillars undertaking the function of safety device against torsioning. The safety device against torsioning itself consists of a plate that encompasses the spindle so as to rotate in unison with it but so as to be axially slidable relative to it, and that is arranged as a bearing thrust on the pillars between the cover and the bridge of the housing. The housing bridge is provided with a thread for the axially slidable guidance of the spindle.

In the following, the invention is explained in more details with the help of the drawings.

DESCRIPTION OF THE PREFERRED EMBODIMENT(S)

Figure 1:
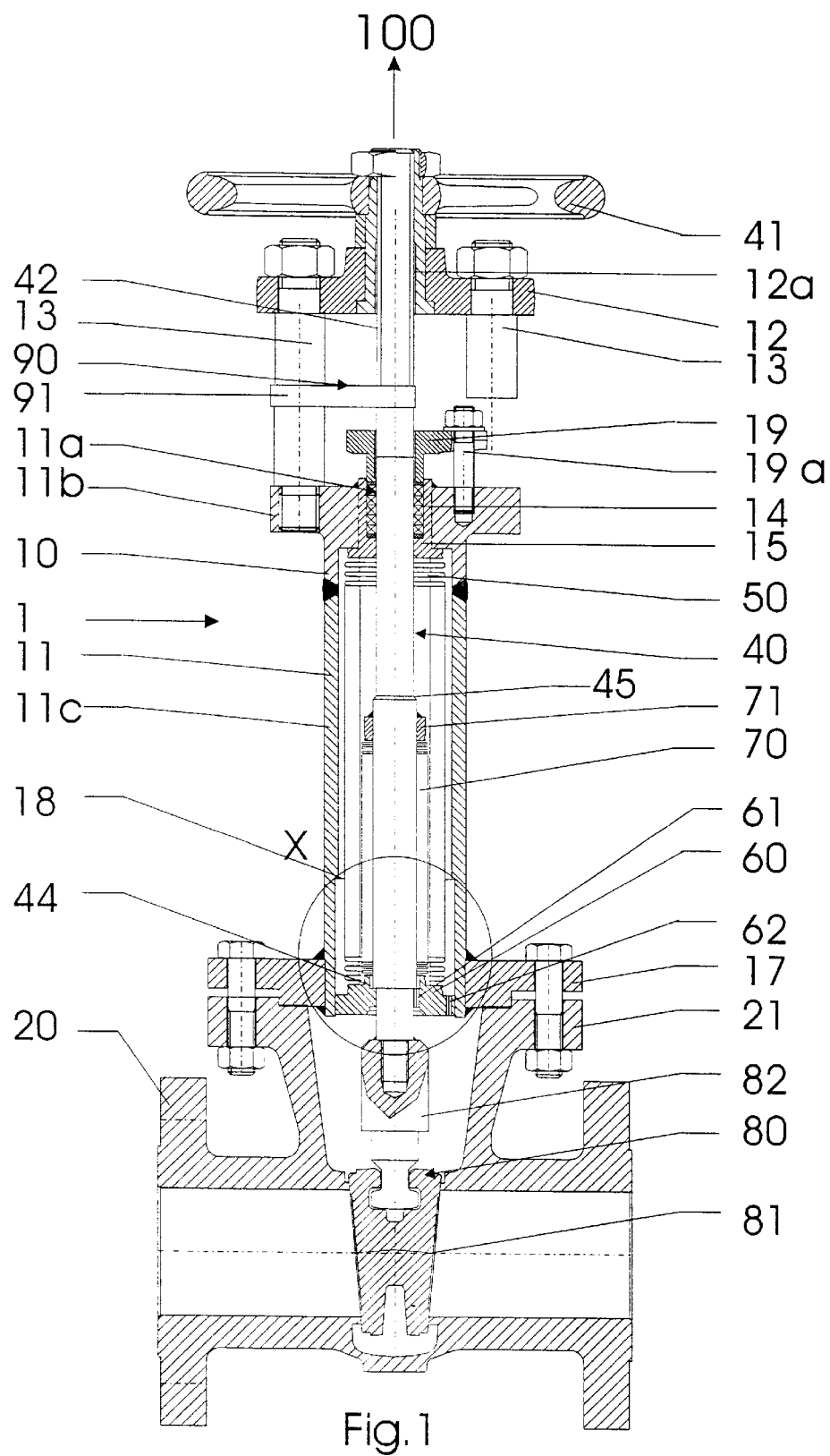
FIG. 1 shows the complete shut-off device for pipes in a sectional view.
Figure 2:
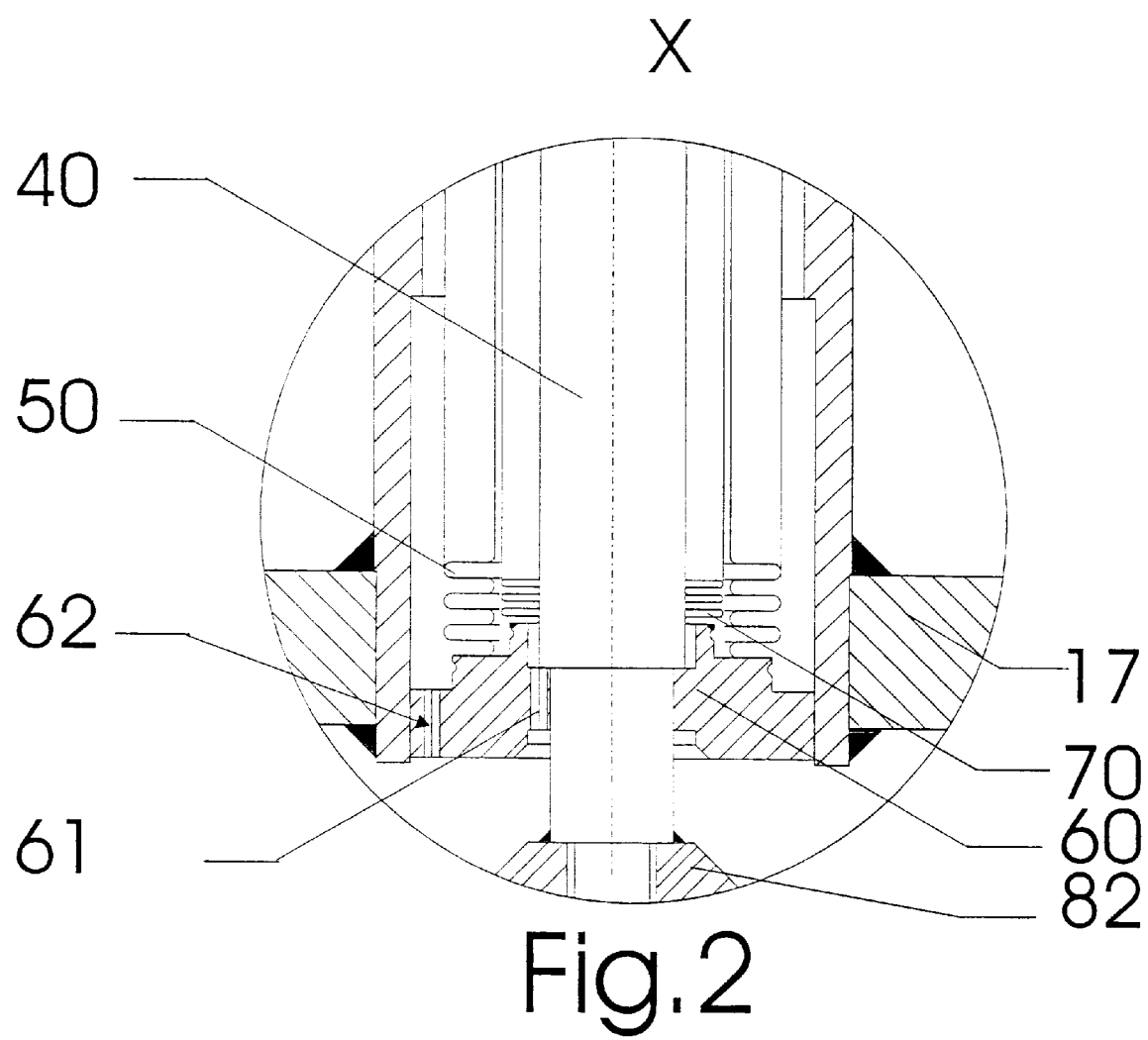
FIG. 2 shows an enlargement of detail X.

The shut-off device for pipes, referred to as a whole with numeral 1, consists of the upper part of the housing 10 and of the housing 20 with the flange 21, whereas the flange 21 is receiving the upper part of the housing 10 of the shut-off device for pipes. The upper part of the housing 10 of the shut-off device for pipes is composed of the cover 11 that is connected to the housing bridge 12 by preferably two pillars 13. On its upper part, the cover 11 has the flange 11b with the boring 11a for the spindle 40. The sleeve-type cover element 11c is attached to the flange 11b, whereas the flange serves for receiving the pillars 13. The cover 11 is provided at its lower end facing the pipe 20 with a flange 17 which is connected with the flange 21 of the housing.

The spindle, which is referred to as a whole with numeral 40, is guided in the upper part of the housing 10. The spindle, which is referred to with numeral 40, is provided on its upper end with the handwheel 41 and is guided in an axially slidable way in the housing bridge 12 via a thread 12a arranged in the housing bridge 12. That means that the spindle 40 has also a thread 42 in this area. The spindle 40 is additionally provided with the circumferential, conical bearing surface 45 coming to rest on the lower end of the gland casing 15. The spindle 40 is entering the cover 11 in the area of the flange 11b by passing through the boring 11a. The flange 11b is provided in the area of the boring 11a with a gland 14 borne in a gland casing 15. The gland 14 is an additional protection preventing the medium carried in the housing 20 from leaking out of the cover. The gland 14 is secured by a stuffing box gland 19 which may be pressed against the gland by means of the screw 19a.

The outer expansion bellows 50 is soldered on the lower end of the gland casing. The outer expansion bellows 50 is also soldered with the ring 60 by its other lower end. The inner expansion bellows 70 is arranged so as to be concentric with the outer expansion bellows 50. The inner expansion bellows 70 is also soldered on the ring 60, but it is connected by its upper end to the spindle 40 via the transition ring 71 by means of a weld seam. The ring 60 has two passages 61 and 62. The passage 61 is communicating with the inner space of the expansion bellows 70, whereas the passage 62 is communicating with the space between the outer wall of the outer bellows 50 and the inner wall of the sleeve-type cover element 11c of the cover 11. The spindle 40 also has the shoulder 44 serving as a bearing surface for the ring 60. The cover 11 is also provided with another shoulder 18 onto which the ring 60 is also coming to rest according to the movement of the spindle 40.

The shut-off device, referred to as a whole with numeral 80, is arranged on the spindle and is projecting into the housing 20 underneath the ring 60. The shut-off device 80 is provided with the key 81 and with the holder for the key, which is referred to with numeral 82 and which is directly connected with the spindle 40.

The spindle 40 is secured against torsioning; to this purpose, a safety device against torsioning 90 is provided. Said safety device consists of a plate 91 supported by the pillar 13. In the area of the spindle, the plate 91 is receiving the spindle in an axially slidable way but so that they are rotating in unison. Thus, as already explained, a torsioning of the spindle can be excluded.

In order to keep the wear and tear as low as possible in the area of the expansion bellows 50 and 70, the inner expansion bellows is prestressed on pressure. That means that the expansion bellows is relieved during the stroke and only stressed on traction. The outer expansion bellows on the contrary is prestressed on traction, that means that during the stroke, the outer bellows is first also relieved and then stressed on pressure. The prestress of each bellows may be such, that at half the maximal stroke of the corresponding spindle, the corresponding bellows is completely relieved.

The shut-off device is working as follows: when opening the shut-off device 81, that is when moving the spindle in direction of the arrow 100, the inner expansion bellows 70 is exerting its stroke until the holder 82 is hitting the ring 60. Then, the outer bellows 50 is executing its stroke until the conical surface 45 is coming to rest on the lower, accordingly conical end of the gland casing 15. The gland casing 15 is serving as a stopper for the outer expansion bellows; when the slide valve is open, the surface 45, resting on the correspondingly conical recess of the gland casing 15, is serving as a metallic sealing from the outside in case of a damaged bellows. In this position, the ring 60 is not constructively adjacent. There is a play of 1–2 mm. It is essential that the stopper 45 is always the first to come to rest in the gland casing 15, since this stopper 45 is serving, in its open position, as a metallic sealing against the outside in case of damaged expansion bellows. Due to the stopper 18, the outer bellows 50 and the inner bellows 70 can no more be pressed together by the medium's pressure or by their own spring forces. The essential point hereby is that the inner bellows, which is, as already mentioned, prestressed under pressure, is standing under a slight traction once the opening procedure is over, whereas the outer bellows, which is first stressed on traction, is stressed on pressure in its final position. That means that in no case the expansion bellows have been exposed to overcharge, which leads to the expectation of a longer service life of the device.

What is claim is:

1. A shut-off device for pipes having a spindle connected to a shut-off element arranged in a housing, said spindle being borne in an upper part of the housing so as to be axially slidable, said upper part of the housing being provided with a cover resting on said housing, said cover having an interior space communicating with a medium led through the housing, said spindle (40) being provided at its lower end facing the shut-off element (80) with a ring (60) carrying at least two concentrically arranged expansion bellows defining an inner expansion bellows (70) and an outer expansion bellows (50), said inner expansion bellows being connected to said spindle, characterized in that said outer expansion bellows (50) is connected to a flange (11*b*) of the cover of the housing (11), the shut-off element (80) slides said ring (60) along the spindle (40) in a sleeve-shaped cover body (11*c*) of the housing cover (11) until it abuts against a stopper (18) in the cover body (11*c*), said inner bellows (70) is pre-tensioned on pressure while said outer bellows (50) is pre-tensioned on tension when the shut-off device for pipes (1) is closed, and when said ring comes to abut on the stopper (18) said inner bellows (70) is submitted to tensile load while said outer bellows is submitted to pressure load.

2. A shut-off device for pipes according to claim 1, characterized in that said inner bellows (70) is connected to said spindle (40) by soldering.

3. A shut-off device according to claim 2, characterized in that said inner bellows (70) is connected to said spindle includes a transition ring at its upper end.

4. A shut-off device according to claim 1, characterized in that said ring (60) is movably arranged on said spindle (40).

5. A shut-off device according to claim 1, characterized in that said ring (60) is arranged in said cover of said housing (11) so as to be axially slidable.

6. A shut-off device according to claim 4, characterized in that said spindle (40) has a shoulder (44) for said ring (60).

7. A shut-off device according to claim 6, characterized in that said shoulder (44) for said ring (60) is circumferential.

8. A shut-off device according to claim 1, characterized in that said inner expansion bellows (70) is impinged from the inside by the pressure of the medium.

9. A shut-off device according to claim 1, characterized in that said outer bellows (50) is impinged from the outside by the pressure of the medium.

10. A shut-off device according to claim 1, characterized in that said cover of said housing (11) is provided with a gland (14) encompassing the spindle (40).

11. A shut-off device according to claim 10, characterized in that said gland (14) is arranged in a gland casing (15) in said cover of said housing (11).

12. A shut-off device according to claim 1, characterized in that said spindle (40) is provided with a safety device against torsioning (90).

13. A shut-off device according to claim 12, characterized in that said upper part of said housing (10) is provided with a housing bridge (12) for said spindle, said bridge being connected to said cover of said housing (11) by pillars (13), said pillars (13) being provided with said safety device against torsioning (90).

14. A shut-off device according to claim 13, characterized in that said housing bridge (12) has a thread (12*a*) intended to guide said spindle (40) in an axially slidable way.

15. A shut-off device according to claim 1, characterized in that said bellows (50, 70) are connected to said ring (60) by soldering.

* * * * *